(12) United States Patent
Calvo

(10) Patent No.: US 9,556,773 B2
(45) Date of Patent: Jan. 31, 2017

(54) MULTISTAGE PLATE MIXER

(71) Applicant: Eberspächer Exhaust Technology GmbH & Co. KG, Neunkirchen (DE)

(72) Inventor: Silvia Calvo, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 193 days.

(21) Appl. No.: 13/940,935

(22) Filed: Jul. 12, 2013

(65) Prior Publication Data
US 2015/0013313 A1   Jan. 15, 2015

(51) Int. Cl.
| | |
|---|---|
| *F01N 3/00* | (2006.01) |
| *F01N 3/20* | (2006.01) |
| *B01F 5/04* | (2006.01) |
| *B01F 5/06* | (2006.01) |
| *B01F 3/04* | (2006.01) |
| *F01N 3/28* | (2006.01) |

(52) U.S. Cl.
CPC ........... *F01N 3/208* (2013.01); *B01F 3/04049* (2013.01); *B01F 5/0473* (2013.01); *B01F 5/0617* (2013.01); *F01N 3/2892* (2013.01); *B01F 2005/0628* (2013.01); *B01F 2005/0639* (2013.01); *F01N 2240/20* (2013.01); *F01N 2610/02* (2013.01); *Y02T 10/24* (2013.01)

(58) Field of Classification Search
CPC ...... F01N 3/208; F01N 3/2803; F01N 3/2066; F01N 3/2892; F01N 13/1872; B01F 5/0606; B01F 3/208; B01F 3/04007; B01F 3/04049; B01F 5/0617; B01F 5/0451; B01F 5/0616; B01F 5/0473
USPC ... 60/295, 301, 303, 317, 324; 366/336, 337
See application file for complete search history.

(56) References Cited

U.S. PATENT DOCUMENTS

| | | | |
|---|---|---|---|
| 2010/0218490 A1* | 9/2010 | Forster et al. | 60/324 |
| 2013/0074480 A1* | 3/2013 | Leicht et al. | 60/295 |
| 2013/0074483 A1* | 3/2013 | Leicht et al. | 60/317 |
| 2014/0298781 A1* | 10/2014 | Naga et al. | 60/301 |

FOREIGN PATENT DOCUMENTS

| | | |
|---|---|---|
| EP | 2 574 750 A1 | 4/2013 |
| EP | 2 594 330 A1 | 5/2013 |

* cited by examiner

*Primary Examiner* — Audrey K Bradley
*Assistant Examiner* — Kelsey Stanek
(74) *Attorney, Agent, or Firm* — McGlew and Tuttle, P.C.

(57) ABSTRACT

A mixing and/or evaporating device (12) for an exhaust system (5) of an internal combustion engine (1) encloses in the circumferential direction a cross section, through which flow is possible. The device (12) has two mutually opposite long side walls (21, 22) and two mutually opposite short side walls (23, 24). The short side walls (23, 24) connect each the two long side walls (21, 22) to one another. A plurality of guide blades (25), which project in the direction of the other long side wall (21, 22) and are set at an angle in relation to the axial direction (20), are arranged at at least one axial end (26, 27) at at least one long side wall (21, 22). Additional guide blades (29) are arranged at at least one long side wall (21, 22) at a distance (s) in the axial direction (20) from an axial end (26).

21 Claims, 4 Drawing Sheets

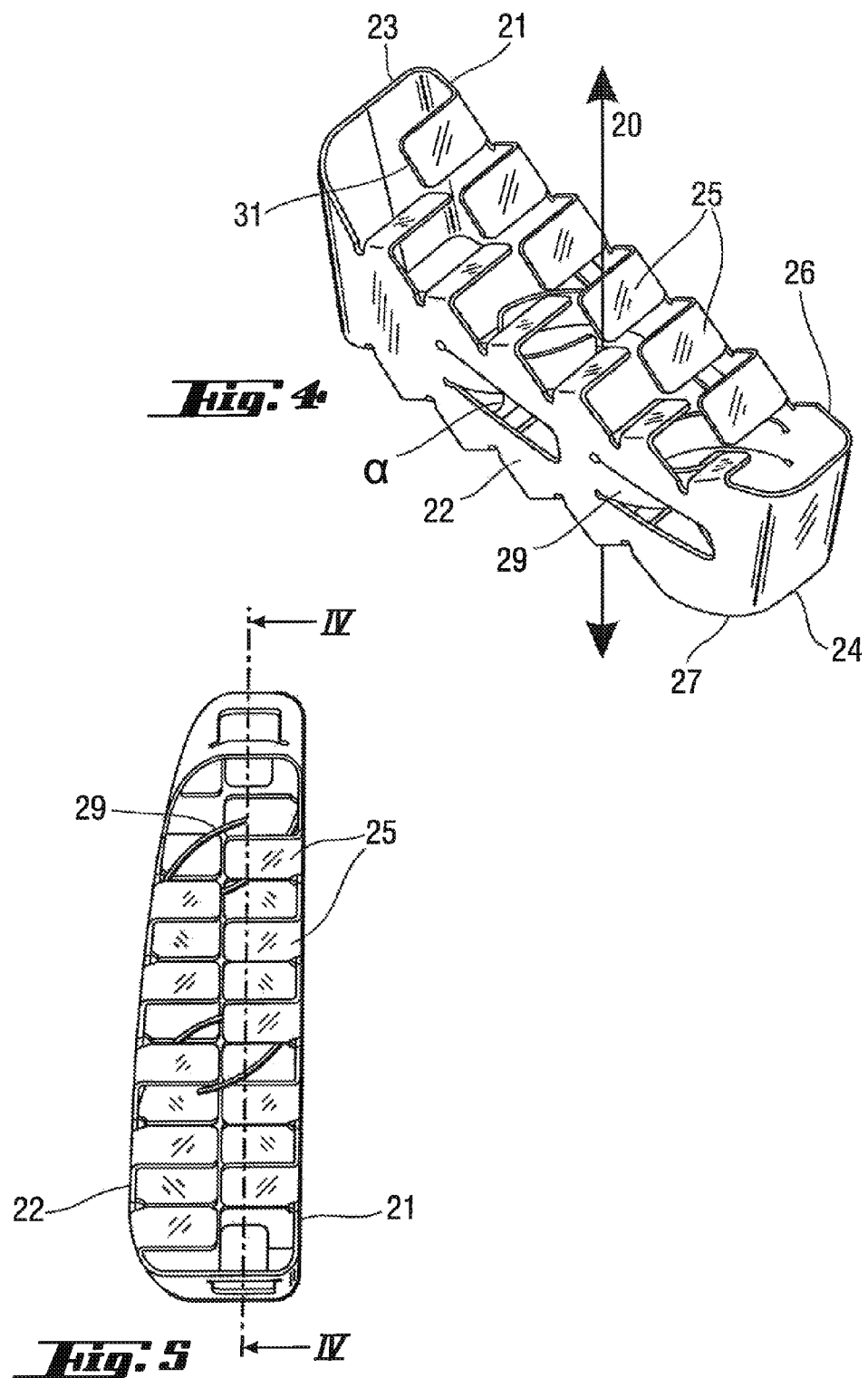

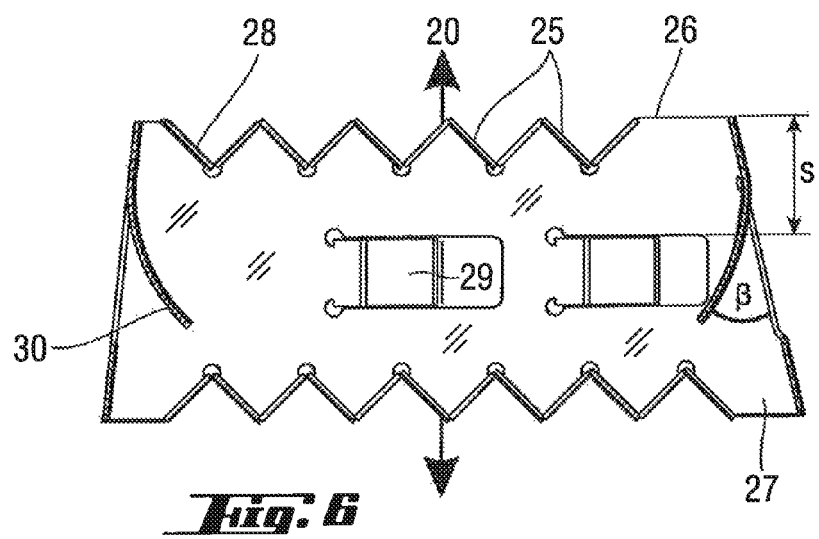
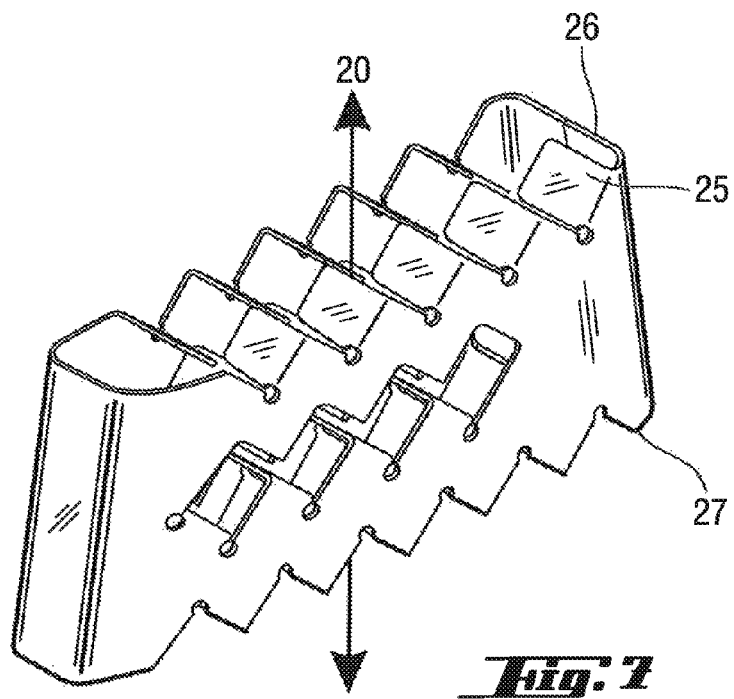

MULTISTAGE PLATE MIXER

FIELD OF THE INVENTION

The present invention pertains to a mixing and/or evaporating means for an exhaust system of an internal combustion engine, especially of a motor vehicle. The present invention pertains, besides, to an exhaust system equipped with such a means as well as to an SCR catalytic converter equipped with such a means.

BACKGROUND OF THE INVENTION

An exhaust system of an internal combustion engine is usually equipped with means for cleaning or treating the exhaust gases removed from the internal combustion engine. It may be necessary in this connection to introduce a liquid educt into the exhaust gas stream, to evaporate it therein and to mix it with the exhaust gas. It may be necessary, for example, to mix a fuel with the exhaust gas upstream of an oxidation catalytic converter in order to bring about heating of the exhaust gas stream by an exothermal reaction of the fuel in the oxidation catalytic converter. The heated exhaust gas stream can then be used downstream of the oxidation catalytic converter to heat another exhaust gas treatment means, for example, another catalytic converter or a particle filter, to operating temperature or regeneration temperature. Furthermore, SCR systems are known which operate with selective catalytic reaction and are equipped with an SCR catalytic converter, which takes up NOx from the exhaust gas stream. A suitable reducing agent, for example, ammonia or urea, preferably an aqueous urea solution, is added to the exhaust gas stream upstream of the SCR catalytic converter. The ammonia will then bring about a conversion of the nitrogen oxides present into nitrogen and water in the SCR catalytic converter.

It applies to all educts fed in the liquid form into the exhaust gas stream that the desired effect can be achieved satisfactorily only if sufficient evaporation of the educt as well as sufficient mixing of the gaseous educt with the exhaust gas stream can take place between the site at which the liquid educt is introduced and a site at which the educt is consumed. The mixing and/or evaporating means mentioned in the introduction, which are arranged in the flow path of the exhaust gas between the site at which the educt is introduced and the site at which the educt is consumed, are used for this purpose.

SUMMARY OF THE INVENTION

The object of the present invention is to provide an improved or at least a different embodiment, which is characterized by a simpler and hence less expensive design, for a means (device) of the type mentioned in the introduction and for an SCR catalytic converter equipped therewith and for an exhaust system equipped therewith, and a lower flow resistance or back pressure as well as improved mixing of the educt with the exhaust gas are sought to be achieved as well. In addition, liquid educt, which collects on walls of the exhaust system to form a film on the wall, can again be fed into the exhaust gas stream.

According to the invention a mixing and/or evaporating device is provided comprising a wall structure (carrier) surrounding, in a device circumferential direction, a flow cross section that extends at a right angle to a device axial direction. The wall structure comprises two mutually opposite long side walls and two mutually opposite short side walls, wherein the short side walls each connect the two long side walls to one another. A plurality of guide blades project from at least one long side wall in a direction of the other long side wall. The plurality of guide blades each have a pitch angle in relation to the device axial direction and are disposed at at least one axial end of the at least one long side wall. An additional guide blade is arranged at one long side wall and spaced from the at least one axial end in the axial direction.

The present invention is based on the general idea of equipping the mixing and/or evaporating device (means) with a carrier (a wall structure), which surrounds, in the circumferential direction, a flat cross section of the device, through which cross section flow is possible and extends at right angles to the axial direction of the device. Thus, the carrier does not define a round cross section, but an elongated or flat cross section, such that the carrier has two mutually opposite long side walls and two mutually opposite short side walls, wherein the short side walls connect each the two long side walls to one another. It is possible due to the design of the carrier as proposed according to the present invention with a flat cross section to arrange a plurality of guide blades, which project in the direction of the other long side wall and which are set at a pitch angle in the axial direction, at at least one long side wall.

The guide blades extend due to this mode of construction at right angles to the axial direction and are arranged, besides, next to each other both at right angles to the axial direction and also at right angles to their longitudinal direction. The axial direction of the device corresponds to a principal direction of flow of the exhaust gas through the device. This principal direction of flow does not take into account flow deflections, cross flows, backflows, turbulences and the like within the cross section through which flow is possible. A row of guide blades, which are arranged in a row next to each other, extend especially in parallel to one another and bring about a flow deflection in the direction of a short side wall, is thus provided at the respective axial end of the respective long side wall.

On the one hand, the guide blades of the respective straight row of guide blades offer a comparatively large impingement area for liquid equipped introduced upstream from them into the exhaust gas stream, so that the liquid can reach the guide blades and evaporate on them and be divided into finer liquid droplets due to the impact. On the other hand, the guide blades bring about intensive flow deflection, which is favorable for the mixing of the evaporated educt with the exhaust gas stream.

To reduce the back pressure of the above-described mixing and/or evaporating device and to achieve better mixing of the educt with the exhaust gas, a plurality of guide blades or rows of guide blades may be arranged in the axial direction of the device. Thus, rows of guide blades may be arranged at the respective axial ends of the long side walls and, in addition, additional rows of guide blades may be arranged between these, i.e., for example, in the axial direction in the middle between the two axial ends. These may be bent about an axis extending in parallel to the axial direction or set at a pitch angle in relation to the axial direction.

An additional process step, in which the already evaporated liquid or still existing liquid drops are swirled one more time and mixed more intensely with the exhaust gas stream, is created by this arrangement of additional guide blades between the guide blades arranged at the axial ends. In addition, the not yet evaporated liquid droplets can reach the additional guide blades and evaporate on these. The efficiency of the entire arrangement is improved in this manner, as a result of which it becomes possible, on the whole, to reduce the number of guide blades or to reduce the size of the impingement area of protruding into the exhaust gas stream with constant mixing. A further reduction of the back pressure can thus be achieved.

A "flat" cross section, through which flow is possible, as was described above, is characterized in that in a first direction extending at right angles to the axial direction, it has a diameter that is greater than a diameter in a direction extending at right angles to the axial direction and at right angles to the first direction. In particular, the diameter in one direction may be at least twice that in the other direction. Round cross sections are excluded hereby, whereas oval and elliptical cross sections may likewise be or are flat. The terms "long" and "short" shall be defined here as relative in relation to one another rather than in absolute terms, so that the long side walls in the circumferential direction are longer than the short side walls. Depending on the geometry of the cross section of the device, through which cross section flow is possible, the long side walls are advantageously straight, while the short side walls may be curved.

Corresponding to an especially advantageous embodiment, the additional guide blades project from the side wall at which they are arranged at an acute angle and are bent about an axis extending in parallel to the axial direction.

The exhaust gas stream is set to rotate or swirled within the carrier by this design, as a result of which an especially intensive mixing of the educt with the exhaust gas takes place. Furthermore, not yet evaporated liquid droplets can reach the additional guide blades and evaporate on these.

Corresponding to another advantageous embodiment, the length of the additional guide blades is selected to be such that a free end of the additional guide blades projects beyond a central longitudinal plane extending in the middle between the long side walls.

A large flow cross section of the exhaust gas stream can be captured in this manner with a small number of additional guide blades and good mixing of the educt with the exhaust gas can be achieved in the area between the guide blades arranged at the axial ends.

According to another advantageous embodiment, two additional guide blades each, arranged at opposite side walls, are arranged such that they are arranged at an equally spaced location from the axial end of the respective side walls in the axial direction.

Two guide blades, which are arranged at the same side wall, are located in this manner opposite each other at equal height and can thus form a guide blade pair, which cooperates in case certain flow conditions and especially rotating flow sections or vortices are created.

In another advantageous embodiment, a plurality of guide blades are arranged along at least one long side wall at an axial end at right angles to the axial direction in relation to one another such that the guide blades located closest to the short side walls in the axial direction have a greater distance from the opposite axial end than the guide blades arranged closer to the middle of the carrier at right angles to the axial direction.

The guide blade surfaces extending at right angles to the direction of flow thus form a concave outer surface of the carrier, which surface is permeable to the exhaust gas. More guide blades or a larger impingement surface can thus be arranged in the exhaust gas stream at constant cross section of the carrier, through which cross section flow is possible.

According to another advantageous embodiment, the additional guide blades project essentially at right angles from the long side wall and extend in the direction of the respective opposite wall, and they are set at an angle in relation to the axial direction.

Due to the straight shape of the guide blades and additional guide blades, the exhaust gas stream is not set to rotate within the carrier, but good mixing can nevertheless be achieved due to the consecutive steps of the rows of guide blades. The flow resistance or the back pressure of the mixing and/or evaporating device can be reduced by avoiding rotation of the exhaust gas stream within the carrier.

A further guide blade is arranged at at least one short side wall in another advantageous embodiment, and the further guide blade projects at an acute angle from the short side wall and is bent about an axis extending at right angles to the central longitudinal plane extending in the middle between the long side walls.

The liquid droplets can be thrown onto walls of the exhaust system and form a film on the wall from liquid educt there due to centrifugal forces, which act on liquid droplets introduced into or entrained in the exhaust gas stream when the exhaust gas is deflected from its straight motion. The further guide blades at the short side walls of the carrier can move liquid from such a film on the wall from the wall and introduce it again into the exhaust gas stream. Moreover, the further guide blades introduced into the guide blade bring about reorientation of the course of the flow in this area, as a result of which better mixing or optimization of the flow distribution can be achieved. The effectiveness of the mixing and/or evaporating device is increased in this manner.

All guide blades are formed integrally at the respective side wall according to another advantageous embodiment. The guide blades and the side walls can be manufactured in this manner in an especially simple manner and at an especially low cost, for example, as a stamped and shaped part from a sheet metal part.

All side walls are formed integrally at the carrier in another advantageous embodiment. The entire device can be manufactured in this manner in an especially simple manner and at an especially low cost, for example, as a stamped and shaped part from a sheet metal part.

The exhaust system according to the present invention comprises at least one SCR catalytic converter, a reducing agent feed device, which has at least one injector for feeding a reducing agent to the exhaust gas stream upstream of the SCR catalytic converter, and at least one mixing and/or evaporating device of the above-described type, which is arranged between the at least one injector and the at least one SCR catalytic converter.

By contrast, an SCR catalytic converter according to the present invention comprises a housing, in which at least one SCR catalytic converter element is arranged, as well as at least one mixing and/or evaporating device of the above-described type, which is arranged in the housing of the SCR catalytic converter upstream of the at least one SCR element.

It is apparent that the above-mentioned features, which will also be explained below, can be used not only in the particular combination indicated, but in other combinations or alone as well, without going beyond the scope of the present invention.

Preferred exemplary embodiments of the present invention are shown in the drawings and will be explained in more detail below, and identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is an isometric view of an embodiment of the mixing and/or evaporating device;

FIG. 5 is a top view of the embodiment shown in FIG. 4;

FIG. 6 is a sectional view along section line IV in FIG. 5;

FIG. 7 is an isometric view of another embodiment of the mixing and/or evaporating device.

DESCRIPTION OF THE PREFERRED EMBODIMENTS

Figure 1:
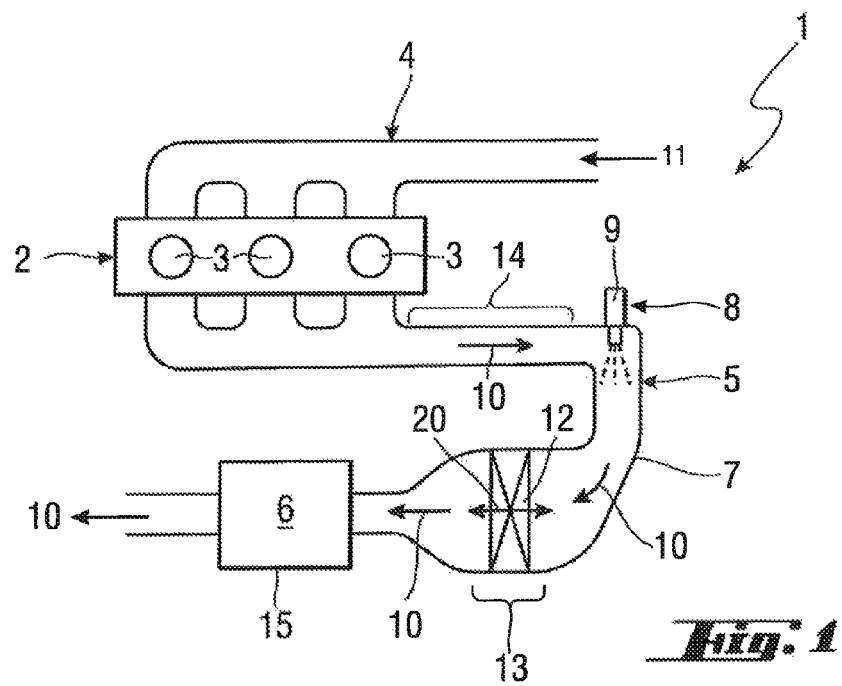
FIG. 1 is a highly simplified, block diagram-like schematic view of an internal combustion engine with an exhaust system.

Referring to the drawings in particular, corresponding to FIG. 1, an internal combustion engine 1 comprises in the usual manner an engine block 2, which has a plurality of cylinders 3. A fresh air feed unit 4 supplies the cylinders 3 of the engine block 2 with fresh air. A corresponding fresh air stream is indicated by an arrow 11. An exhaust system 5 removes combustion waste gases from the cylinders 3 of the engine block 2 during the operation of the internal combustion engine 1. Furthermore, the exhaust system 5 brings about exhaust gas cleaning and exhaust gas treatment. The exhaust system 5 is equipped for this with at least one SCR catalytic converter 6, which is integrated into an exhaust gas line 7 of the exhaust system 5 in a suitable manner. The SCR catalytic converter may also be designed here as a particle filter or diesel particle filter, which is provided with a corresponding coating. The exhaust system 5 comprises, furthermore, a reducing agent feed device 8, which has at least one injector 9 or a tube 9, by means of which a reducing agent can be introduced into an exhaust gas stream 10, which flows in the exhaust gas line 7 during the operation of the internal combustion engine 1 and is indicated by arrows. The reducing agent is injected into the exhaust gas stream 10 upstream of the SCR catalytic converter 6. The exhaust gas line 7 includes an exhaust gas line portion 14. The exhaust gas stream 10 flows through the exhaust line portion 14 in a direction of the reducing agent feed device 8.

The exhaust system 5 comprises, furthermore, a mixing and/or evaporating device 12, which will hereinafter be called mixing/evaporating device 12 for short. Mixing/evaporating device 12 is arranged in the exhaust gas line 7 between the injector 9 and the SCR catalytic converter 6, so that the exhaust gas with the added reducing agent must at first flow through the mixing/evaporating device 12 before the mixture reaches the SCR catalytic converter.

Figure 2:
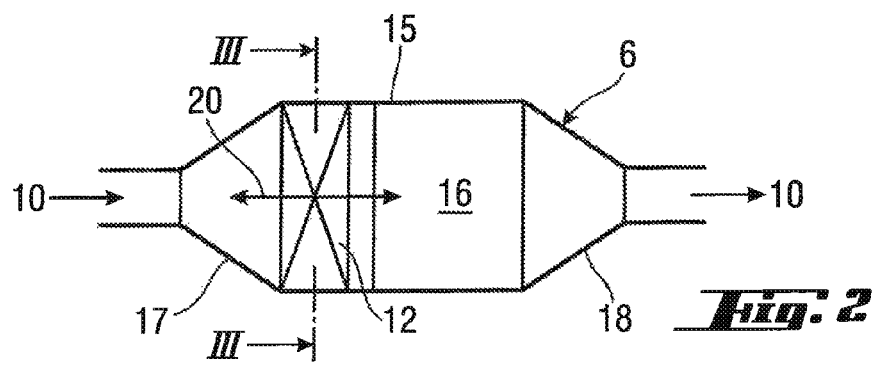
FIG. 2 is a highly simplified, block diagram-like view of an SCR catalytic converter.

Contrary to this, FIG. 2 shows an embodiment in which the SCR catalytic converter 6 and the mixing/evaporating device 12 form an integral unit. At least one SCR catalytic converter element 16 is arranged for this in the housing 15 of the SCR catalytic converter 6, and mixing/evaporating device 12 is arranged, moreover, in the housing 15 upstream of this SCR catalytic converter element 16. Mixing/evaporating device 12 and the SCR catalytic converter element 16 are thus arranged in a common housing 15.

Housing 15 comprises an inlet funnel 17 and an outlet funnel 18 in the example according to FIG. 2, and mixing/evaporating device 12 and the SCR catalytic converter element 16 are arranged between the two funnels 17, 18.

Figure 3A:
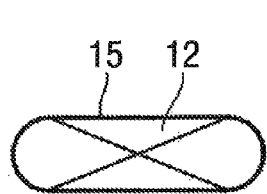
FIG. 3A is a cross sectional view of the SCR catalytic converter corresponding to section lines III in FIG. 2 for one of different embodiments.
Figure 3B:
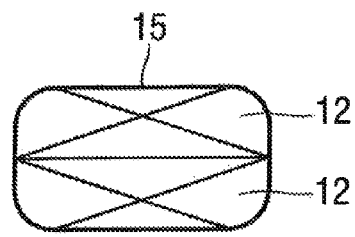
FIG. 3B is a cross sectional view of the SCR catalytic converter corresponding to section lines III in FIG. 2 for another of different embodiments.

According to FIGS. 3A and 3B, housing 15 may have in the area of mixing/evaporating device 12 a flat cross section, through which flow is possible, and to which the respective mixing/evaporating device 12 is adapted. FIG. 3A shows an embodiment in which the cross section of housing 15, through which cross section flow is possible, is filled by means of a single mixing/evaporating device 12. Contrary to this, FIG. 3B shows an embodiment in which the cross section of housing 15, through which cross section flow is possible, is filled by means of two mixing/evaporating device 12 arranged next to each other. A corresponding statement can also be made for the arrangement of mixing/evaporating device 12 in the exhaust gas line 7, so that at least two mixing/evaporating device 12 may be arranged next to each other in area 13 there as well in order to fill out the cross section of the exhaust gas line 7, through which cross section flow is possible.

Since the cross section of mixing/evaporating device 12, through which cross section flow is possible, is flat, the carrier 19 has two long side walls 21, 22, which are located opposite each other, as well as two short side walls 23, 24, which are likewise located opposite each other. The short side walls 23, 24 connect the two respective long side walls 21, 22.

Furthermore, mixing/evaporating device 12 is equipped with a plurality of guide blades 25, which project each from one of the long side walls 21, 22 in the direction of the other long side wall 21, 22 and project at an axial end 26 or 27 of mixing/evaporating device 12 or of carrier 19 or the respective long side wall 21, 22. If the exhaust gas flow is oriented corresponding to arrow 10, one axial end 26, at which the flow arrives first, forms an incoming flow side, which will hereinafter likewise be designated by 26, while the other axial end 27 forms a discharge side, which will hereinafter likewise be designated by 27.

The guide blades 25 extend each in a straight line as well as in parallel to one another. Furthermore, the guide blades 25 are planar in the embodiments being shown here. In addition, they are set at an angle in relation to the axial direction 20. A pitch angle of the guide blades 25 in relation to the axial direction 20 is 45° within the framework of usual manufacturing tolerances in the examples being shown here.

The guide blades 25 extend at right angles to the axial direction 20 and are arranged, besides, next to each other at right angles to their longitudinal extension and at right angles to the axial direction 20 in a row, which may also be designated row of guide blades 28.

Provisions are made in the embodiments according to FIGS. 4-8 for guide blades 25, which project in the direction of the other long side wall 21, 22, to be arranged each at the two long side walls 21, 22 at at least one axial end 26, 27. As a result, two rows of blades 28, which are arranged next to each other and extend in parallel to one another, are provided in the embodiments being shown here at the respective axial end 26, 27, i.e., on the incoming flow side 26 and on the discharge side 27. The guide blades 25 located opposite each other here are dimensioned, for example, such that they extend, starting from the corresponding long side wall 21, 22, to a central longitudinal plane, which extends centrally between the two long side walls 21, 22. Embodiments in which rows of guide blades 28 can be arranged at one long side wall 21 only or at one axial end 26 only are also conceivable as an alternative.

The guide blades 25 of the two long side walls 21, 22 may extend in the direction of the other side wall 21, 22 in another alternative embodiment to the extent that the guide blades 25 of the first long side wall 21 protrude into the gaps between adjacent guide blades 25 of the other side wall 22, so that a common row of guide blades 29 is ultimately formed, which is formed by the guide blades 25 of the two long side walls 21, 22, with the guide blades 25 of the two long side walls 21, 22 alternating within this common row of guide blades 28.

The guide blades 25 are each arranged and dimensioned in the embodiments being shown here such that, being located at spaced locations from the respective long side wall 21, 22 from which they start, they end detached or have a free end 31. The guide blades 25 of the embodiments being shown thus have, in particular, no contact with the respective opposite long side wall 21, 22 and have no contact with the other guide blades 25.

If, as can be recognized in the embodiments according to FIGS. 4-8, guide blades 25 are provided at both axial ends 26, 27, these may be set either in the same direction or opposite the axial direction 20. The guide blades 25, which are arranged at the same axial end 26, 27 but at opposite long side walls 21, 22, are set at an angle opposite the axial direction 20 in the embodiments being shown here. In other words, the guide blades 25 of one row of blades 28, which are formed at one long side wall 21, are set at an angle on the incoming flow side 26 and/or on the discharge side 27 in relation to the axial direction 20 opposite the guide blades 25 of the other row of blades 28, which are formed at the other long side wall 22.

Additional guide blades 29 are arranged at the two long side walls 21, 22 at a distance s in the axial direction 20 from an axial end 26 in an embodiment shown in FIGS. 4-6. These project at an acute angle α from the respective long side wall 21, 22 and are bent about an axis extending in parallel to the axial direction 20 such that their free end 21 points essentially towards the opposite long side wall. The additional guide blades 29 are adjusted in relation to the axial direction 20 in this embodiment, because the deflection of the exhaust gas stream is brought about by the bent shape of the additional guide blades 29. Due to the setting of the guide blades 25 at an angle, the exhaust gas stream in the interior of the carrier 19 is a laminar flow in parallel to the axial direction 20, but it is directed at different angles or swirled in relation thereto. Individual areas of the exhaust gas stream therefore reach the bent surfaces of the additional guide blades 29 such that two flows rotating about axes extending in parallel to the axial direction 20 are formed. Very good mixing of the gaseous educt with the exhaust gas stream can take place in this manner.

Moreover, further guide blades 30 are arranged at the short side walls 23, 24 in the embodiment shown in FIGS. 4-6. These project from the short side walls 23, 24 at an acute angle β and are bent in the direction of flow about an axis extending at right angles to the axial direction (20) and at right angles to the central longitudinal plane extending in the middle between the long side walls (21, 22) such that they project in the direction of the opposite short side wall 23, 24. A film on the wall of liquid educt, which may be formed on the walls of the exhaust system due to droplets adhering thereto, can again be returned into the exhaust gas stream by these further guide blades 30.

The additional guide blades 29 are not bent but are straight in an embodiment shown in FIG. 7, and, corresponding to the guide blades 25, they project essentially at right angles from the long side walls 21, 22 and are set at an angle in relation to the axial direction 20. The pitch angle of the respective additional guide blade 29 is opposite to the respective upstream guide blade 25. An additional mixing stage is created within the carrier 19 in this manner, and non-evaporated liquid drops will additionally reach the guide blade surfaces set at an angle and are divided and evaporated into even finer droplets on these.

Figure 8:
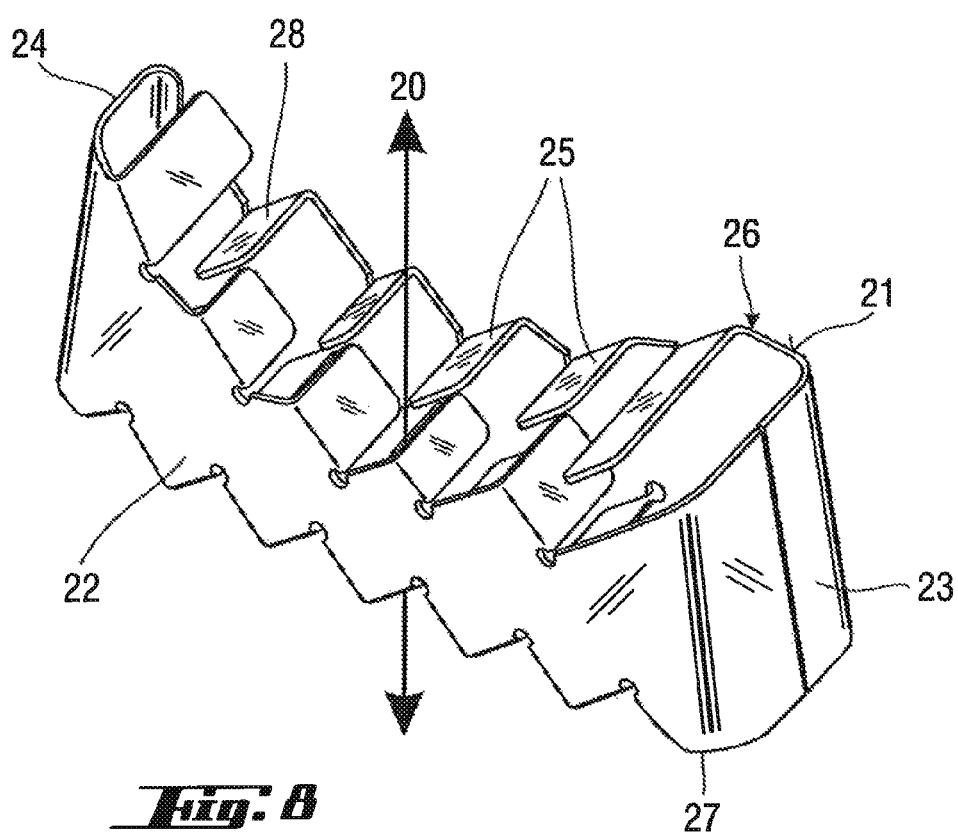
FIG. 8 is an isometric view of another embodiment of the mixing and/or evaporating device.

FIG. 8 shows another embodiment, in which the rows of guide blades 28 extend concavely to the carrier 19 at the upstream axial ends 26, 27. In other words, the guide blades 25, which are arranged on the outer sides of the carrier 19, i.e., closest to the short side walls 23, 24, have the shortest distance in the exhaust gas stream from the reducing agent feed device 8. By contrast, the guide blade 25 arranged farther inside, i.e., farther away from the short side walls 23, 24, are arranged at a greater distance from the reducing agent feed device 8. It is possible due to this arrangement to arrange more guide blades or a larger impingement surface of the guide blades 25 in the exhaust gas stream at constant cross section of the carrier, through which cross section flow is possible.

Carrier 19 is a shaped sheet metal part, which integrally comprises the four side walls 21, 22, 23, 24, in the exemplary embodiments described. Furthermore, the guide blades 25 at the respective long side wall 21, 22 are formed integrally, so that the complete mixing/evaporating device 12 is manufactured ultimately from a single shaped sheet metal part. Manufacture may be carried out here from an elongated, strip-shaped sheet metal blank, in which the guide blades 25 are first cut free. The guide blades 25 may subsequently be bent. Finally, the strip of sheet metal may be bent corresponding to the flat cross section of the mixing/evaporating device 12, through which cross section flow is possible, in order to form the long and short side walls 21, 22, 23, 24 of carrier 19. The longitudinal ends of the blank may be fastened to one another at one short side wall 23 corresponding to a connection seam 31.

While specific embodiments of the invention have been shown and described in detail to illustrate the application of the principles of the invention, it will be understood that the invention may be embodied otherwise without departing from such principles.

The invention claimed is:
1. A device for an exhaust system of an internal combustion engine, the device comprising:
 a carrier, which defines, in a device circumferential direction, a flat cross section, through which flow is possible, the flat cross section extending at right angles to a device axial direction, the carrier comprising:
  two mutually opposite long side walls and two mutually opposite short side walls, wherein the short side walls each connect the two long side walls to one another; and
  a plurality of guide blades, which each project from at least one long side wall in a direction of the other long side wall, set at a pitch angle in relation to the device axial direction at at least one axial end of the at least one long side wall, each of said plurality guide blades being connected to said axial end at a position along a length of said axial end, and wherein additional guide blades are arranged at least at one long side wall in the axial direction at one or more distance from the at least one axial end.

2. A device in accordance with claim 1, wherein the additional guide blades project from the long side wall at an acute angle and are bent about an axis extending in parallel to the device axial direction.

3. A device in accordance with claim 1, wherein a length of the additional guide blades is selected to be such that a free end of the additional guide blades projects beyond a central longitudinal plane extending in the middle between the long side walls.

4. A device in accordance with claim 1, wherein two additional guide blades, each arranged at opposite side walls, are arranged such that they are arranged at the same distance in the axial direction from the axial end of the respective side wall.

5. A device in accordance with claim 1, wherein the plurality of guide blades are arranged along at least one long side wall at said one axial end at right angles to the device axial direction in relation to one another such that the guide blades located closest to the short side walls have a greater distance in the device axial direction from an opposite axial end of the at least one long side wall than the guide blades arranged closer to a center of the carrier at right angles to the device axial direction.

6. A device in accordance with claim 1, wherein the additional guide blades project at right angles from the long side wall and extend in the direction of the respective opposite wall, and the additional guide blades are set at a pitch angle in relation to the device axial direction.

7. A device in accordance with claim 1, wherein a further guide blade is arranged at at least one short side wall, said further guide blade projecting at an acute angle from the short side wall and being bent about an axis extending at right angles to the central longitudinal plane.

8. A device in accordance with claim 1, wherein all guide blades are formed integrally on the respective side wall, each of said guide blades extending inwardly from an outermost edge of said at least one long side wall in a direction of the other long side wall, wherein each of said guide blades is arranged between said two short side walls on an incoming flow side of said carrier.

9. A device in accordance with claim 1, wherein all side walls are formed integrally on the carrier, said carrier comprising an incoming flow side and a discharge side, each of said guide plates being arranged at least on said incoming flow side, wherein each of said guide blades comprises a planar surface, said planar surface of each of said guide blades facing in a direction of one of said short side walls.

10. An exhaust system for an internal combustion engine, especially of a motor vehicle, with at least one SCR catalytic converter, with a reducing agent feed means, which has at least one injector for feeding a reducing agent into the exhaust gas stream upstream of the SCR catalytic converter, and with at least one device arranged between the at least one injector and the at least one SCR catalytic converter, the device comprising a wall structure defining, in a device circumferential direction, a flat flow cross section that extends at a right angle to a device axial direction, the wall structure comprising:
two mutually opposite long side walls;
two mutually opposite short side walls, wherein the short side walls each connect the two long side walls to one another;
a plurality of guide blades projecting from at least one long side wall in a direction of the other long side wall, the plurality of guide blades each having a pitch angle in relation to the device axial direction and being disposed at at least one axial end of the at least one long side wall, each of said plurality guide blades being connected to said axial end at a position along a length of said axial end; and
an additional guide blade arranged at one long side wall and spaced from the at least one axial end in the axial direction.

11. An exhaust system in accordance with claim 10, wherein the additional guide blade projects from the long side wall at an acute angle and is bent about an axis extending in parallel to the device axial direction, each of said guide blades comprising a planar surface for engaging an incoming flow of fluid, said planar surface of each of said guide blades facing in a direction of one of said short side walls, said two mutually opposite long side walls and said two mutually opposite short sides defining said flat cross section through which fluid flows.

12. An exhaust system in accordance with claim 10, wherein a length of the additional guide blade is selected to be such that a free end of the additional guide blade projects beyond a central longitudinal plane extending in the middle between the long side walls.

13. An exhaust system in accordance with claim 10, wherein the wall structure further comprises another additional guide blade, to provide at least two additional guide blades whereby each additional guide blade is arranged on an opposite long side walls spaced the same distance, in the axial direction, from the axial end of the respective long side wall.

14. An exhaust system in accordance with claim 10, wherein the plurality of guide blades include guide blades disposed at said at least one axial end and located closest to the short side walls with a greater distance in the device axial direction from an opposite axial end of the at least one long side wall than the guide blades disposed at said at least one axial end and arranged farther from the short side walls.

15. An exhaust system in accordance with claim 10, wherein the additional guide blade projects at right angles from the long side wall and extends in a direction of the respective opposite wall, and is set at a pitch angle in relation to the device axial direction.

16. An exhaust system in accordance with claim 10, wherein the wall structure further comprises a further guide blade arranged at at least one short side wall, the further guide blade projecting at an acute angle from the short side wall and being bent about an axis extending at right angles to the central longitudinal plane.

17. An exhaust system in accordance with claim 10, wherein the wall structure is an integral single piece structure, each of said guide blades extending inwardly from an outermost edge of said at least one long side wall in a direction of the other long side wall, wherein each of said guide blades is arranged between said two short side walls on an incoming flow side of said carrier.

18. An SCR catalytic converter for an exhaust system of an internal combustion engine, the SCR catalytic converter comprising:
a housing;
an SCR catalytic converter element arranged in the housing; and
a device arranged in the housing upstream of the SCR catalytic converter element, the device comprising a wall structure defining, in a device circumferential direction, a flat flow cross section that extends at a right angle to a device axial direction, the wall structure comprising:
two mutually opposite long side walls;
two mutually opposite short side walls, wherein the short side walls each connect the two long side walls to one another;
a plurality of guide blades projecting from at least one long side wall in a direction of the other long side wall, the plurality of guide blades each having a pitch angle in relation to the device axial direction and being disposed at at least one axial end of the at least one long side wall, each of said plurality guide blades being connected to said axial end at a position along a length of said axial end; and
an additional guide blade arranged at one long side wall and spaced from the at least one axial end in the axial direction.

19. An SCR catalytic converter in accordance with claim 18, wherein the wall structure further comprises another additional guide blade, to provide at least two additional guide blades whereby each additional guide blade is arranged on an opposite long side walls spaced the same distance, in the axial direction, from the axial end of the respective long side wall, each of said guide blades comprising a planar surface for engaging an incoming flow of fluid, said planar surface of each of said guide blades facing in a direction of one of said short side walls.

20. An SCR catalytic converter in accordance with claim 18, the wall structure further comprises a further guide blade arranged at at least one short side wall, the further guide blade projecting at an acute angle from the short side wall and being bent about an axis extending at right angles to the central longitudinal plane, each of said guide blades extending inwardly from an outermost edge of said at least one long side wall in a direction of the other long side wall, wherein each of said guide blades is arranged between said two short side walls on an incoming flow side of said carrier.

21. An SCR catalytic converter in accordance with claim 18, wherein the plurality of guide blades include guide blades disposed at said at least one axial end and located closest to the short side walls with a greater distance in the device axial direction from an opposite axial end of the at least one long side wall than the guide blades disposed at said at least one axial end and arranged farther from the short side walls.

* * * * *